United States Patent [19]
Zimmermann et al.

[11] Patent Number: 6,084,693
[45] Date of Patent: Jul. 4, 2000

[54] PROCESS AND APPARATUS FOR THE DETERMINATION OF HALFTONE PERCENTAGE VALUES

[75] Inventors: Bruno Zimmermann, Zurich; Hans Ott, Regensdorf; Thomas Senn, Adlikon bei Regensdorf, all of Switzerland

[73] Assignee: Gretag Aktiengesellschaft, Regensdorf, Switzerland

[21] Appl. No.: 08/591,304

[22] Filed: Jan. 25, 1996

Related U.S. Application Data

[62] Division of application No. 07/916,711, Jul. 22, 1992, Pat. No. 5,530,563.

[30] Foreign Application Priority Data

Aug. 20, 1991 [EP] European Pat. Off. .............. 91810662

[51] Int. Cl.[7] .................................................. H04N 1/46
[52] U.S. Cl. ........................... 358/534; 358/517; 358/518
[58] Field of Search ..................................... 358/517, 518, 358/519, 520, 521, 534; 395/118, 131

[56] References Cited

U.S. PATENT DOCUMENTS

| | | | |
|---|---|---|---|
| 4,814,891 | 3/1989 | Uchiyama et al. | 358/296 |
| 4,926,254 | 5/1990 | Nakatsuka et al. | 358/296 |
| 4,967,283 | 10/1990 | Uchiyama et al. | 358/296 |
| 5,181,068 | 1/1993 | Morikawa | 358/79 |
| 5,182,721 | 1/1993 | Kipphan et al. | 356/407 |

*Primary Examiner*—Thomas D. Lee
*Attorney, Agent, or Firm*—Burns, Doane, Swecker & Mathis, L.L.P.

[57] ABSTRACT

The invention relates to the use of a spectrophotometer connected with a computer to measure and store a solid color atlas in the computer. The halftone percentage values necessary for the adjustment of a given color are calculated by determining the desired color coordinates of the color involved and entered into the computer. The latter calculates from them, using the stored color atlas and a regression method, the halftone percentage values sought. In the process, with the aid of printing characteristics, stored color adaptations to prevailing printing conditions can be brought up to date without the need for the preparation of a new solid color atlas.

2 Claims, 8 Drawing Sheets

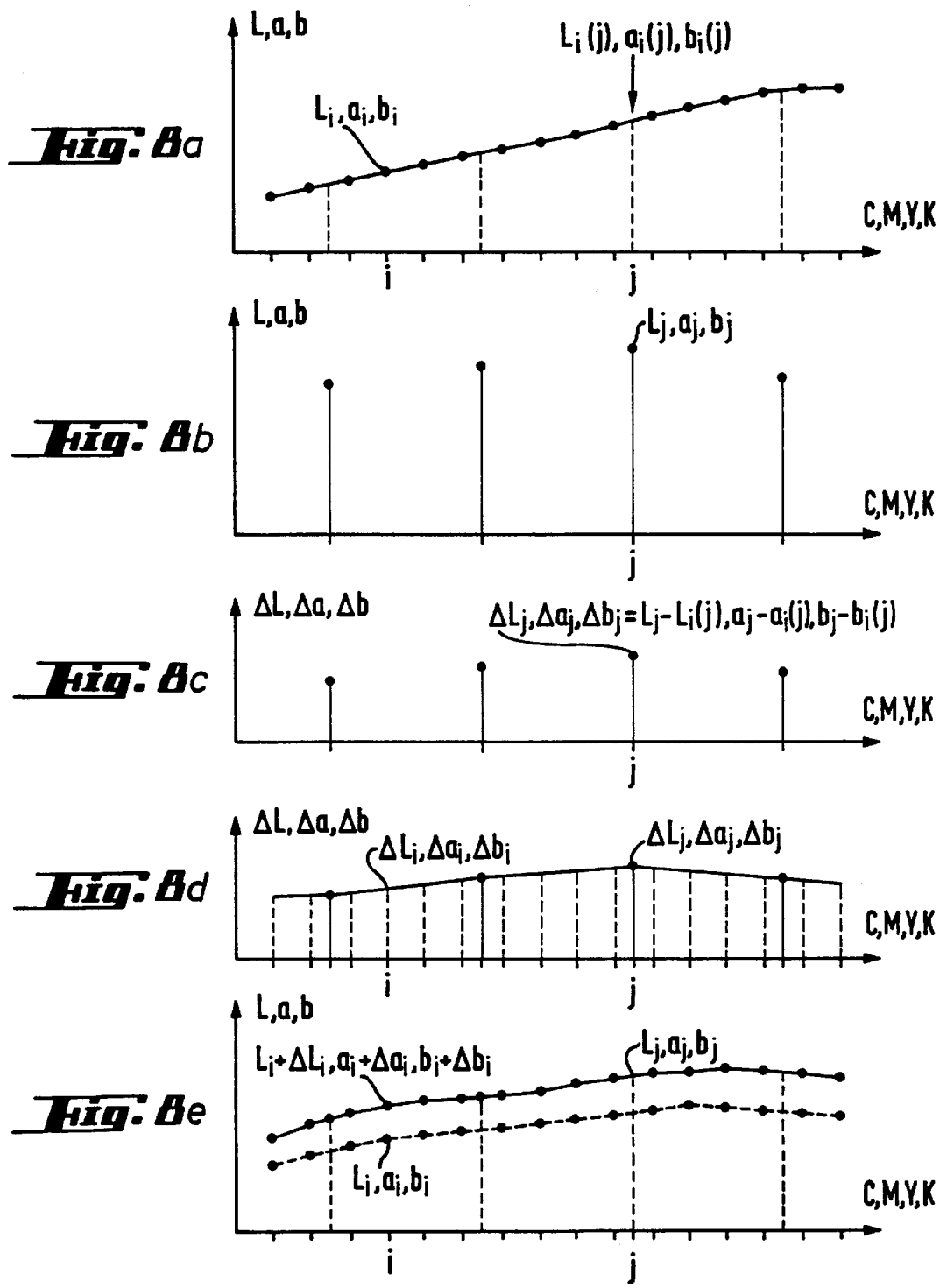

PROCESS AND APPARATUS FOR THE DETERMINATION OF HALFTONE PERCENTAGE VALUES

This application is a Divisional of application Ser. No. 07/916,711, now U.S. Pat. No. 5,530,563, filed Jul. 22, 1992 and issued Jun. 25, 1996.

BACKGROUND OF THE INVENTION

The invention relates to a process and an apparatus for the determination of the halftone percentage values required to obtain a given desired color location using the individual printing colors in autotype multicolor printing.

One of the fundamental problems in reproduction and printing practice is to exactly reproduce a given color with a predetermined color location by printing methods and to determine the surface coverages or halftone percentage values required of the individual printing colors in the halftone films or printing plates upon which the reproduction process is based. Usually, a color atlas is used for this purpose. The atlas contains a plurality of color fields of known graduated halftone percentage values of the individual printing colors. The color to be reproduced is visually compared with the color fields of the color atlas. The color field that in the ideal case is identical with the color to be reproduced or the color field that comes closest to the color to be reproduced, yields the halftone percentage values desired.

A precondition of the reliability of this method is that the color atlas contain a very large number of color fields in as small graduations as possible and that the color atlas be produced under the same reproduction conditions as those provided for the color to be reproduced. In offset printing this includes, among other conditions, the printing inks used, the different halftone forms and layouts, the substrate (paper) to be printed and the printing characteristics of the printing machine used, etc. This requires the production by a reproduction plant of a large number of different and extremely voluminous color atlases, which is very expensive. Furthermore, the use of different and very voluminous color atlases is often considered to be cumbersome and time consuming. Smaller color atlases require a difficult visual interpolation that can be carried out only by experienced personnel in a somewhat reliable manner.

So-called electronic color atlas systems are also known, wherein the halftone percent values and the color coordinates of the color fields of a solid color atlas are stored in tabular form in a computer. The color coordinates of the color to be reproduced are determined by a color measuring device and entered into the computer, whereupon the latter retrieves the halftone percentage numbers fitting the color coordinates entered from the stored table. By means of specially developed interpolation processes and transformation algorithms between the color space and the surface coverage space, intermediate values may also be determined, whereby the problems of visual interpolation are avoided and fewer support locations (color fields) may suffice. However, the aforementioned fundamental problem (i.e., that the color atlas is only valid in a strict sense for the specific printing conditions upon which it is based) is not eliminated by this system.

Another difficulty arises in standard four-color printing, wherein usually a certain proportion of the colors cyan, magenta and yellow is replaced by black ink. Numerous color atlases either do not contain this ink at all or to a limited extent only and it is very difficult for reproduction personnel to decide by visual comparison which is the most suitable or possibly even the only correct proportion of black. The known electronic color atlases again do not provide a satisfactory solution in actual practice for this purpose.

SUMMARY OF THE INVENTION

The present invention is intended to improve a process and an apparatus of the abovementioned generic type so that a color atlas containing extremely few color fields will suffice. Such a color atlas is simple to produce and use in actual practice. In addition, conditions are to be created whereby even for different printing conditions altogether, fewer different color atlases would be required.

Further, a basis for a solution to the problem of determining a black proportion in four color printing is to be created.

A process according to the invention and a corresponding apparatus for attaining these objects determine the halftone percentage values of individual printing inks required to obtain a given desired color location during multiple color printing using a color atlas which includes a plurality of color fields having known graduated halftone percentage values of the individual printing inks, the process comprising steps of determining color locations of the color fields by defining color coordinates for the color fields; storing the color locations of the color fields together with the known graduated halftone percentage values of the color fields; and determining halftone percentage values of the given desired color location based on desired color coordinates of the given desired color location, said step of determining halftone percentage values further including the steps of interpolating the halftone percentage values of the given desired location from the stored color coordinates and the stored halftone percentage values of the color fields using a differential weighted compensating calculation wherein a relationship between the stored halftone percentage values and the stored color coordinates of the color fields in a vicinity of the desired color location is approximated by approximating functions, such that greater differences between stored color coordinates and the desired color location are weighted less in the differential weighted compensating calculation than smaller differences.

The weight with which stored color coordinates of individual color fields enter a compensating computation is preferably chosen by the formula $G_i = 1/(\Delta E_i)^g$, wherein $G_i$ is the prevailing weight, $\Delta E_i$ is the color difference of the prevailing color field from the desired color location and wherein g is an empirical exponent of 0.5 to 7, preferably 1 to 3.

According to another advantageous embodiment of the invention, a process is carried out so that in a compensating computation for calculation of new color coordinates and the associated halftone percentage values, the relationship of the stored color coordinates to stored halftone percentage values of the color fields in the vicinity of a preselected halftone percentage value of a selected printing ink is approximated. More particularly, functions are approximated in a manner such that relative to the preselected halftone percentage value of the printing ink chosen, stored halftone percentage values exhibiting a greater difference are taken into account with a lesser weight than those showing a smaller difference.

A particularly advantageous further development of a process is characterized in that in four-color printing, the halftone percentage value of a printing ink selected, in particular black, is preselected and that halftone percentage values of the other three printing inks are determined taking into consideration the preselected halftone percentage value of the printing ink selected. This is effected preferably by computing new color coordinates and associated new halftone percentage values from the stored color coordinates and halftone percentage values of the color fields and the preselected halftone percentage value of the printing ink chosen. Preferably, a differential weighted compensation calculating method is used whereby all associated new halftone percentage values are set equal to the preselected halftone percentage value, and the halftone percentage values of the three other printing inks to be determined are calculated from the new color coordinates and the new halftone percentage values. For example, the halftone percentage value to be determined for the printing ink selected is preselected as a variable parameter and varied to satisfy an additional secondary condition, while the halftone percentage values of the other three printing inks are calculated relative to a new variation value of the preselected halftone percentage value of the printing ink selected until the additional secondary condition is satisfied. The process is preferably carried out so that the halftone percentage value of the selected printing ink to be determined is initially chosen as a maximum or a minimum. The determination of the halftone percentage values of the other three printing inks, beginning with a starting value for the halftone percentage value to be determined for the printing ink selected, is repeated for different values of the halftone percentage value to be determined of the printing ink selected until the halftone percentage value to be determined for the printing ink selected has reached a terminal value such that if said terminal value is exceeded or not attained, the halftone percentage value of at least one of the other three printing inks would be outside a permissible range of values. Another advantageous embodiment is characterized in that the halftone percentage value to be determined of the printing ink selected is preselected in keeping with a defined black build-up method.

According to another preferred embodiment, metamerism effects are taken into account. For the color fields of the color atlas, separate sets of color coordinates are determined for different types of light. The halftone percentages values to be determined for the individual printing inks are calculated, in one of the separate sets of color coordinates, and from the halftone percentages values calculated, the associated color coordinates are calculated for the other types of light. As an additional secondary condition, it is required that the metamerism effect expressed by a difference of the color locations relative to the desired color locations defined by the sum of the optionally weighted color differences of the color coordinates of the other types of light calculated in this manner, be at a minimum.

An adaptation to altered tonal value increments may be obtained according to another advantageous embodiment of the invention by correcting halftone percentage values of the individual printing inks in keeping with the characteristic lines of the printing machine to be used, representing the relationship between the nominal halftone percentage values and the tonal value increments.

Advantageously, adaptations to variations of the printing substrate are effected by taking into consideration, in the determination of the color coordinates of the color fields of the color atlas, possible deviations of the first substrate upon which the color atlas is printed, from the second substrate upon which the given color location is to be printed. This is carried out conveniently by determining the color coordinates of the color fields of the color atlas from the reflectance spectra of the color fields and by multiplying each spectra reflectance value by the quotient of the spectral reflectance value of the second substrate and the spectral reflectance value of the first substrate at the prevailing wave length. Alternately, this may be attained by calculating the color coordinates of the color fields of the color atlas from the reflectance spectra of the color fields and the standard color values calculated from them according to CIE, with each standard color value being multiplied by the quotient of the pertinent standard color value of the second substrate and the pertinent standard color value of the first substrate.

A particularly suitable adaptation of the process to changing printing conditions may be obtained advantageously by establishing under typical printing conditions a typical color atlas with a first number of color fields, determining the color coordinates of its color fields and storing them together with the associated known halftone percentage values of the individual printing inks. A comparative color atlas is prepared under the prevailing conditions of the printing of the given color location, with a second number of color fields of known graduated halftone percentages values of the individual printing inks, and the color coordinates of the comparative color atlas color fields are determined, wherein the second number is smaller than said first number. Using the typical color atlas and the comparative color atlas, a valid color atlas adapted to the actual printing conditions with a third number of color fields equal to the first number is calculated, and the necessary halftone percentage values are determined from the actual color atlas. This is preferably effected by calculating from the typical color atlas and the comparative color atlas a difference color atlas with a fourth number of color fields equal to the first number. For the calculation of the actual color atlas, the difference color atlas is superposed on the typical color atlas.

As color coordinates, preferably the $L^*,a^*,b^*$ coordinates or the $L^*,u^*,v^*$ coordinates according to CIE are used. Preferably, a color atlas is used, the color fields of which for each printing ink are graduated in 3–10, preferably 4–6 and in particular 4–5, different halftone percentage values.

BRIEF DESCRIPTION OF THE DRAWINGS

Other objects and advantages of the present invention will become more apparent from the following detailed description of preferred embodiments when read in conjunction with the accompanying drawings wherein like elements are designated by like numerals and wherein:

FIGS. 8a–8e show a diagram to explain the steps according to FIG. 7.

DETAILED DESCRIPTION OF PREFERRED EMBODIMENTS

Figure 1:
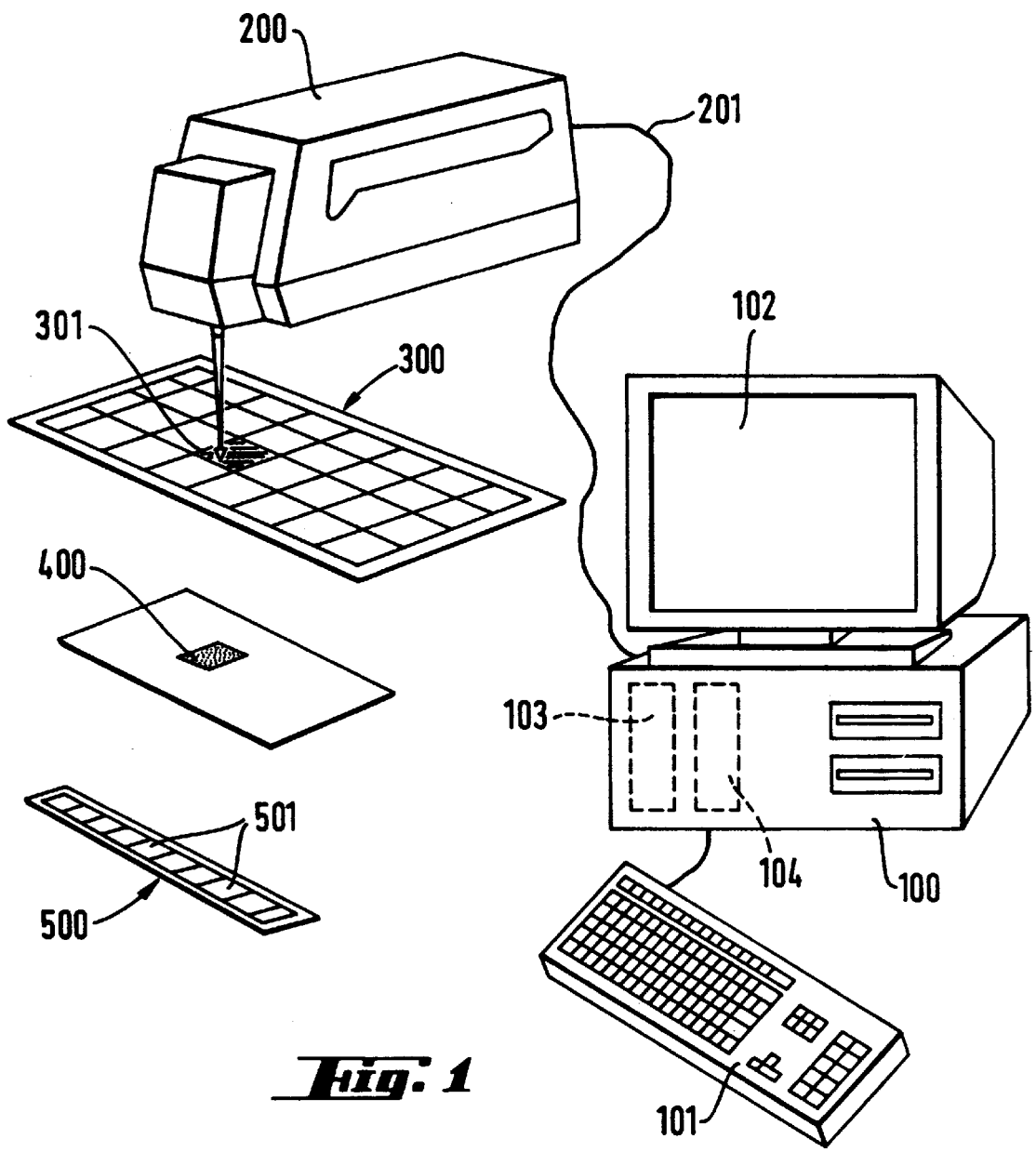
FIG. 1 shows a schematic view of an exemplary embodiment of an apparatus according to the invention.

An apparatus according to the invention, as shown in FIG. 1, includes a computer 100, equipped with an operating keyboard 101 and a data output device in the form of a video monitor 102, together with a program memory 103 indicated by broken lines and a similar working memory 104. A photometric measuring instrument is also shown as spectrophotometer 200. The computer 100 is a standard personal computer configuration, for example, of the AT or 386 class. The spectrophotometer 200 is for example the SPM 100 instrument of Gretag, AG, Regensdorf, Switzerland. The spectrophotometer 200 is equipped with a serial interface and is connected by a cable 201 with the computer 100. The spectrophotometer makes possible the acquisition of reflectance spectra of measuring objects under illumination conditions standardized in the graphical industry and among others, the computation of color coordinates from reflectance spectra according to pertinent standards, for example of CIE (Commission Internationale de l'Eclairage: International Illumination Commission). The spectrophotometer 200 is positioned manually on the object of measurement. The measurement may be actuated manually or by the computer 100, as is the transfer of the measuring data—either the reflectance spectra themselves or the color coordinates of the object of measurement calculated from the reflectance spectra—into the computer 100. Spectrophotometers connected with an external computer and controlled by it, are known and therefore require no further explanation relative to their general configuration and their general fundamental mode of operation.

In the program memory 103 of the computer, a program is stored that enables the computer to carry out the steps of a process according to the invention to be explained hereinbelow. As in the case of any personal computer, the program obviously may also be stored temporarily only. The same is true for stored and/or calculated data.

The basis of a process according to an exemplary embodiment of the invention is a solid color atlas 300 produced under typical printing conditions and consisting of a single sheet printed with color fields. Typical printing conditions are, for example, the standardized printing conditions established by the organization FOGRA/UGRA. The printing conditions include, in offset printing among others, the characteristics of the printing machine used, the printing inks applied, the form and layout of the halftone dots, the paper or generally the substrate to be printed, etc.

The color atlas 300 includes a number of color fields 301 of known, graduated nominal surface coverages or nominal halftone percentage values of all printing inks. In standard four-color printing, the printing inks cyan, magenta, yellow, and black are typically used. Every color field 301 provides a certain visual color impression, that may be quantified by means of a set of color coordinates in a given color space. Hereinafter, color coordinates are defined for example in a given color space. Hereinafter, color coordinates are defined for example as L*,a*,b* coordinates according to CIE, determined under a selected type of light. However, other color coordinates, for example the L*,u*,v* coordinates according to CIE are also suitable. In order to simplify the notation, in the following discussion the * symbol is eliminated from the color coordinates. Nominal surface coverages and halftone percentage values are defined as those of the halftone films and printing plates upon which printing is based. The real, (i.e., actual halftone percentage values) of the printed color fields are generally somewhat higher due to the tonal value increments and halftone dot enlargements described by the printing characteristics of the printing machine used.

The halftone percentage values of the color fields comprise, for each printing ink, between 3 and 10 graduations. According to an aspect of the invention, only 3–6 graduations are provided per printing ink, and preferably only 4–5. The following exemplary embodiment is based on 4 graduations per printing ink.

According to the invention, this restriction to relatively few graduations of the individual halftone percentage values makes it possible to prepare a handy color atlas on a single sheet that may be used in daily practice simply and without problems. In addition, its preparation is not expensive. However, the restriction to relatively few color fields renders certain specific measures necessary in the numerical evaluation; they are described in detail in the following.

As a first preparatory step, the solid color atlas 300 is read into the computer 100 and stored therein as an electronic color atlas in a tabular form. For this purpose, each individual color field 301 is measured by means of the spectrophotometer 200 and the reflectance spectrum taken in this manner is transferred to the computer. However, as seen in the following, it is advantageous to have the reflectance spectra of the color fields available in the computer. From the reflectance spectra received, the computer determines for each color field the color coordinates L,a,b and stores them, together with the nominal halftone percentage values of the individual printing inks belonging to the color field involved, in an assigned (i.e., coordinated) form in the working memory 104. The halftone percentage values of the color fields may be entered, for example, by means of the keyboard 101. The color coordinates are calculated from the reflectance spectra in a manner known in itself by the standard CIE formulas.

When this process is complete, an electronic color atlas is stored in the computer, the individual color fields of which are described by a quadruple of stored halftone percentage values for the four printing inks cyan, magenta, yellow and black and by the stored color coordinates L, a and b. The entirety of the seven numerical values for all of the color fields forms the electronic or stored equivalent of the solid color atlas 300. The individual color fields are each described by the aforementioned seven numerical values and are designated hereafter as support locations. Furthermore, in the following, whenever no confusion is possible, the aforementioned entirety of the stored color coordinates and halftone percentage values is designated the (stored) color atlas.

The stored color atlas contains solid colors, and thus includes, in the present example, 256 color fields resulting from four graduations for each of the halftone percentage values in the individual printing inks. For example, the graduations are chosen to be equal and amount, for example, to 0%, 33%, 66% and 100%. Other graduations are obviously possible. Accordingly, the stored color atlas comprises 256 support locations with seven associated numerical values each.

Naturally, the stored color atlas must be prepared once only, as it is preserved if stored properly.

In calculating the color atlas, potential adaptations are effected (e.g., adjusted) to altered printing conditions or the color atlas is converted into an actual color atlas using a comparative color atlas. However, these steps will not be considered at this time; they will be described in detail hereinbelow.

As a next step, color coordinates of the desired color to be printed, the halftone percentage values of which are to be determined, are entered in the computer. This is carried out either by the direct entry of the color coordinates by means of the keyboard 101 or by measuring a color sample or a color pattern 400 with the spectrophotometer 200 and transferring the measured data into the computer. The color coordinates may be determined in the spectrophotometer 200 itself or in the computer 100 from the reflectance spectra measured. The color coordinates of the color to be printed (desired color location) are referred to hereafter as desired color coordinates.

Up to now, an exemplary process according to the invention, aside from the special design of the color atlas, essentially corresponds to the known processes with electronic color atlas systems. Characteristic elements of a process according to the invention are expressed by the following process steps.

A first key aspect of an exemplary process according to the invention consists of reducing the number of the support locations of the color atlas to be taken into account in all subsequent calculations by the preselection of the desired halftone percentage value of an arbitrarily chosen printing ink. As a general rule, the printing ink selected is black, however in view of the conceptual symmetry of the exemplary process, any other of the four printing inks would be suitable. More particularly, this is done by calculating 64 new support locations from the 256 support locations, with the halftone percentage value of the printing ink chosen having a preselected halftone value $K_v$ selected by means of approximating functions. In calculating the support locations, halftone percentage values in the printing ink chosen which exhibit a larger difference relative to the preselected halftone percentage value $K_v$ of the printing ink selected, enter the compensating calculation with a lesser weight than support locations with a smaller difference.

In a one-dimensional compensating calculation used here, (i.e., relative to one selected printing ink only), the approximating functions are applied, for example, as polynomials of the second degree; i.e., $$L_i = C_{0,L} + C_{1,L} \cdot K_i + C_{2,L} \cdot K_i^2$$

$$a_i = C_{0,a} + C_{1,a} \cdot K_i + C_{2,a} \cdot K_i^2$$

$$b_i = C_{0,b} + C_{1,b} \cdot K_i + C_{2,b} \cdot K_i^2$$

The index i here extends from 1 to 4, corresponding to the (four) graduations of the black printing ink selected, $L_i$, $a_i$ and $b_i$ represent the stored color coordinates of the four color fields or support locations, which here differ only by the halftone percentage values $K_i$ in the printing ink selected (here black) and the stored halftone percentage values of which are equal relative to the other three printing inks (here cyan, magenta and yellow), with $K_i$ representing the stored halftone percentage values (here four) in the printing ink selected; and $C_{0,L}$ to $C_{2,L}$, $C_{0,a}$ to $C_{2,a}$ and $C_{0,b}$ to $C_{2,b}$ are the regression coefficients to be determined.

In the matrix mode, the above three systems of equations, each containing four equations, may be expressed as follows:

$$\vec{L} = (K) \cdot \vec{C}_L$$

$$\vec{a} = (K) \cdot \vec{C}_a$$

$$\vec{b} = (K) \cdot \vec{C}_b$$

wherein, L, a, b are the vectors ($L_1$ to $L_4$), ($a_1$ to $a_4$) and ($b_1$ to $b_4$) and $\vec{C}_L$, $\vec{C}_a$ and $\vec{C}_b$ are the vectors ($C_{0,L}$ to $C_{2,L}$), ($C_{0,a}$ to $C_{2,a}$), and ($C_{0,b}$ to $C_{2,b}$). The matrix (K) consists of the elements $$(K) = \begin{pmatrix} 1 & K_1 & K_1^2 \\ 1 & K_2 & K_2^2 \\ 1 & K_3 & K_3^2 \\ 1 & K_4 & K_4^2 \end{pmatrix}$$

Weighting is now effected by multiplying each of the four equations of the three systems of equations with a weighting factor G:

$$G_i \cdot L_i = G_i \cdot (C_{0,L} + C_{1,L} \cdot K_i + C_{2,L} \cdot K_i^2)$$

$$G_i \cdot a_i = G_i \cdot (C_{0,a} + C_{1,a} \cdot K_i + C_{2,a} \cdot K_i^2)$$

$$G_i \cdot b_i = G_i \cdot (C_{0,b} + C_{1,b} \cdot K_i + C_{2,b} \cdot K_i^2)$$

Written in the matrix mode with the weighting matrix:

$$G = \begin{pmatrix} G_1 & 0 & 0 & 0 \\ 0 & G_2 & 0 & 0 \\ 0 & 0 & G_3 & 0 \\ 0 & 0 & 0 & G_4 \end{pmatrix}$$

this yields $$\vec{G} \cdot L = \vec{G} \cdot K \cdot C_L$$

$$\vec{G} \cdot a = G \cdot K \cdot \vec{C}_a$$

$$\vec{G} \cdot b = G \cdot K \cdot \vec{C}_b$$

respectively with $\vec{L}_g = G \cdot \vec{L}$, $\vec{a}_g = G \cdot \vec{a}$, and $\vec{b}_g = G \cdot \vec{b}$ and with $K_g = G \cdot K$:

$$\vec{L}_g = K_g \cdot \vec{C}_L$$

$$\vec{a}_g = K_g \cdot \vec{C}_a$$

$$\vec{b}_g = K_g \cdot \vec{C}_b$$

The unknown regression coefficients $\vec{C}_L$, $\vec{C}_a$ and $\vec{C}_b$ or explicitly $C_{0,L}$, $C_{1,L}$, $C_{2,L}$, $C_{0,a}$, $C_{1,a}$, $C_{2,a}$ and $C_{0,b}$, $C_{1,b}$, $C_{2,b}$ are now determined by the known method of least squares according to the following relationships:

$$\vec{C}_L = (K_g^T \cdot K_g)^{-1} \cdot K_g^T \cdot \vec{L}_g$$

$$\vec{C}_a = (K_g^T \cdot K_g)^{-1} \cdot K_g^T \cdot \vec{a}_g$$

$$\vec{C}_b = (K_g^T \cdot K_g)^{-1} \cdot K_g^T \cdot \vec{b}_g$$

wherein $K_g^T$ is the transposed matrix of $K_g$ and $(K_g^T \cdot K_g)^{-1}$ is the inverse matrix of $(K_g^T \cdot K_g)$.

With the regression coefficients obtained in this manner, the approximating functions for L, a and b are determined and the L, a, b values belonging to the preselected halftone percentage value $K_v$ of the printing ink chosen may be determined by substituting the preselected halftone percentage value into the approximating functions.

The weighting factors $G_i$ are chosen inversely proportional to the difference between the preselected halftone percentage value $K_v$ and the stored halftone percentage value $K_i$: $G_i = 1/|K_v - K_i|$. Optionally, the weighting factors $G_i$ may also be selected according to the relationship $G_i = 1/|K_v - K_i|^e$ wherein e is an empirically determined exponent within a range of 1 to 3.

The above compensating computation is carried out for all 4 combinations of the support locations or color fields, which finally leads to 64 new support locations. The halftone percentage value in the printing ink selected has the preselected halftone percentage value $K_v$, and the halftone percentage values C, M and Y in the other three printing inks are unchanged. The associated color coordinates L, a, b are the result of the abovedescribed interpolation or compensating calculation. The 64 new support locations form a reduced color atlas and further calculation steps of the process according to the invention are carried out only with the data of these 64 new support locations and the reduced color atlas defined by them.

In the preselection of the halftone percentage value $K_v$ of a selected printing ink the halftone percentage value $K_v$ may be given either as a constant value or as a variable parameter. In the latter case, all of the preceding and subsequent calculations described relative to a constant given halftone percentage value are carried out for each individual variation value of the variable parameter. The additional degree of freedom obtained by the variation of the parameter may be used to satisfy an additional secondary condition, or to optimize the result of the calculations relative to such a secondary condition. Details are set forth hereinbelow.

Following the aforedescribed recalculation or reduction of the color atlas of the four halftone percentage values $C_Z$, $M_Z$, $Y_Z$ and $K_Z$, a halftone percentage value in the form of the preselected halftone percentage value of the printing ink selected is present. In the present example this is the halftone percentage value $K_Z$ of the black printing ink, i.e., $K_Z=K_v$. The objective of the following calculation is now the determination of the three other halftone percentage values from the data of the reduced color atlas. This is effected in a manner similar to the calculating methods applied to the reduction of the color atlas, again by means of a differential weighted compensating calculation, wherein the relationships of the three stored color coordinates in the (new) support locations with respect to the associated stored halftone percentage values are approximated in each case in the vicinity of the desired color location to be reset with the desired color coordinates $L_a$, $a_a$, $b_a$ by means of approximating functions, wherein the larger color differences $\Delta E_i$ of support locations from the desired color location $L_a$, $a_a$, $b_a$ are taken into account with a lesser weight $G_i$ than the support locations with a smaller difference. The color difference $\Delta E_i$ is defined by the expression $\Delta E_i=(L_i-L_a)^2+(a_i-a_a)^2+(b_i-b_a)^2)^{1/2}$, wherein $L_a$, $a_a$ and $b_a$ are the desired color coordinates of the given desired color location and $L_i$, $a_i$ and $b_i$ are the stored color coordinates of the support location i in the (reduced) color atlas. The color difference dependent weight or the weighting factor $G_i$ is selected preferably according to the formula $G_i=1/(\Delta E_i)^g$, wherein g is an empirically determined exponent within a range of 0.5 to 7, preferably 1 to 3. An increase in g leads to a stronger weighting of the support locations in the vicinity of the desired color location. This results in the fact that the approximating functions $f_L$, $f_a$, $f_b$ represent the expression L,a,b↔C,M,Y in an increasingly limited range. In actual practice even further removed support locations must make a contribution. The optimum for the exponent g, empirically determined or obtained by comparative calculations, is around g=2.

In the following multidimensional comparative calculation, the relationships between the color coordinates $L_i$, $a_i$, $b_i$ and the halftone percentage values $C_i$, $M_i$, $Y_i$ are approximated by the approximating functions $f_L$ $(C_i,M_i,Y_i)$, $f_a$ $(C_i,M_i,Y_i)$ and $f_b$ $(C_i,M_i,Y_i)$ as follows:

$$G_i \cdot L_i = G_i \cdot f_L(C_i M_i Y_i) \quad i = 1 \ldots 64$$

$$G_i \cdot a_i = G_i \cdot f_a(C_i M_i Y_i) \quad i = 1 \ldots 64$$

$$G_i \cdot b_i = G_i \cdot f_b(C_i M_i Y_i) \quad i = 1 \ldots 64$$

The index i increases from 1 to the number of support locations of the reduced color atlas, here 64. $C_i$, $M_i$, $Y_i$ are the stored halftone percentage values of the printing inks cyan, magenta and yellow in the prevailing support location i; $L_i$, $a_i$ and $b_i$ are the associated stored color coordinates in the support location i; and $G_i$ are the aforementioned weighting factors.

The three approximating functions $f_L$, $f_a$ and $f_b$ have identical structures and are set, for example, as follows (the indices i, L, a and b are omitted):

$$f(C,M,Y)=k_0+k_1 \cdot C+k_2 \cdot M+k_3 \cdot Y+k_4 \cdot C \cdot M+k_5 \cdot C \cdot Y+k_6 \cdot M \cdot Y+k_7 \cdot C^2+k_8 \cdot M^2+k_9 \cdot Y^2.$$

With the abbreviated vector and matrix notations:

$$\vec{k}_L = (k_{0,L} \cdots k_{9,L}) \quad \vec{k}_a = (k_{0,a} \cdots k_{9,a}) \quad \vec{k}_b = (k_{0,b} \cdots k_{9,b})$$

$$\vec{L} = (L_1 \cdots L_{64}) \quad \vec{a} = (a_1 \cdots a_{64}) \quad \vec{b} = (b_1 \cdots b_{64})$$

$$G = \begin{pmatrix} G_1 & & \varnothing \\ & \ddots & \\ \varnothing & & G_{64} \end{pmatrix}$$

$$A = \begin{pmatrix} 1 & C_1 & M_1 & Y_1 & C_1 \cdot M_1 & C_1 \cdot Y_1 & M_1 \cdot Y_1 & C_1^2 & M_1^2 & Y_1^2 \\ \vdots & & & & & & & & & \\ 1 & C_i & M_i & Y_i & C_1 \cdot M_i & C_i \cdot Y_i & M_i \cdot Y_i & C_i^2 & M_i^2 & Y_i^2 \\ \vdots & & & & & & & & & \\ 1 & C_{64} & M_{64} & Y_{64} & C_{64} \cdot M_{64} & C_{64} \cdot Y_{64} & M_{64} \cdot Y_{64} & C_{64}^2 & M_{64}^2 & Y_{64}^2 \end{pmatrix}$$

the system of equations consisting of 3×64 equations for the 3×10 unknown regression coefficients $k_{0,L} \ldots k_{9,L}, k_{0,a} \ldots k_{9,a}, k_{0,b} \ldots k_{9,b}$ is as follows:

$$G \cdot \vec{L} = G \cdot A \cdot \vec{k}_L$$

$$G \cdot \vec{a} = G \cdot A \cdot \vec{k}_a$$

$$G \cdot \vec{b} = G \cdot A \cdot \vec{k}_b$$

With the designations $G \cdot \vec{L} = \vec{L}_g$, $G \cdot \vec{a} = \vec{a}_g$, $G \cdot \vec{b} = \vec{b}_g$ and $G \cdot A = A_g$ it reads as follows:

$$\vec{L}_g = A_g \cdot \vec{k}_L$$

$$\vec{a}_g = A_g \cdot \vec{k}_a$$

$$\vec{b}_g = A_g \cdot \vec{k}_b$$

The regression coefficients $\vec{k}_L, \vec{k}_a$ and $\vec{k}_b$ are determined by the known method of least squares according to the following conditions:

$$\vec{k}_L = (A_g^T \cdot A_g)^{-1} \cdot A_g^T \cdot \vec{L}_g$$

$$\vec{k}_a = (A_g^T \cdot A_g)^{-1} \cdot A_g^T \cdot \vec{a}_g$$

$$\vec{k}_b = (A_g^T \cdot A_g)^{-1} \cdot A_g^T \cdot \vec{b}_g$$

wherein $A_g^T$ is the transposed matrix of $A_g$ and $(A_g^T \cdot A_g)^{-1}$ corresponds to the inverse of $(A_g^T \cdot A_g)$.

With the regression coefficients calculated in this manner the approximating functions $f_L$, $f_a$ and $f_b$ are determined. It is now necessary to resolve the resulting three equations:

$$L_a = f_L(C_z M_z Y_z)$$

$$a_a = f_a(C_z M_z Y_z)$$

$$b_a = f_b(C_z M_z Y_z)$$

for the three unknowns $C_Z$, $M_Z$ and $Y_Z$ representing the three halftone percentage values for the three remaining printing inks after the selection of one printing ink. $L_a$, $a_a$, $b_a$ are the desired color coordinates of the desired color to be adjusted.

Because the three equations are not linear, they are therefore solved by a known method. For example, the generally used Newton-Kantorowitsch method described in the literature (see for example Bronstein-Semedjajew: Handbook of Mathematics) can be used. No detailed explanation of the method is necessary here.

Figure 2:
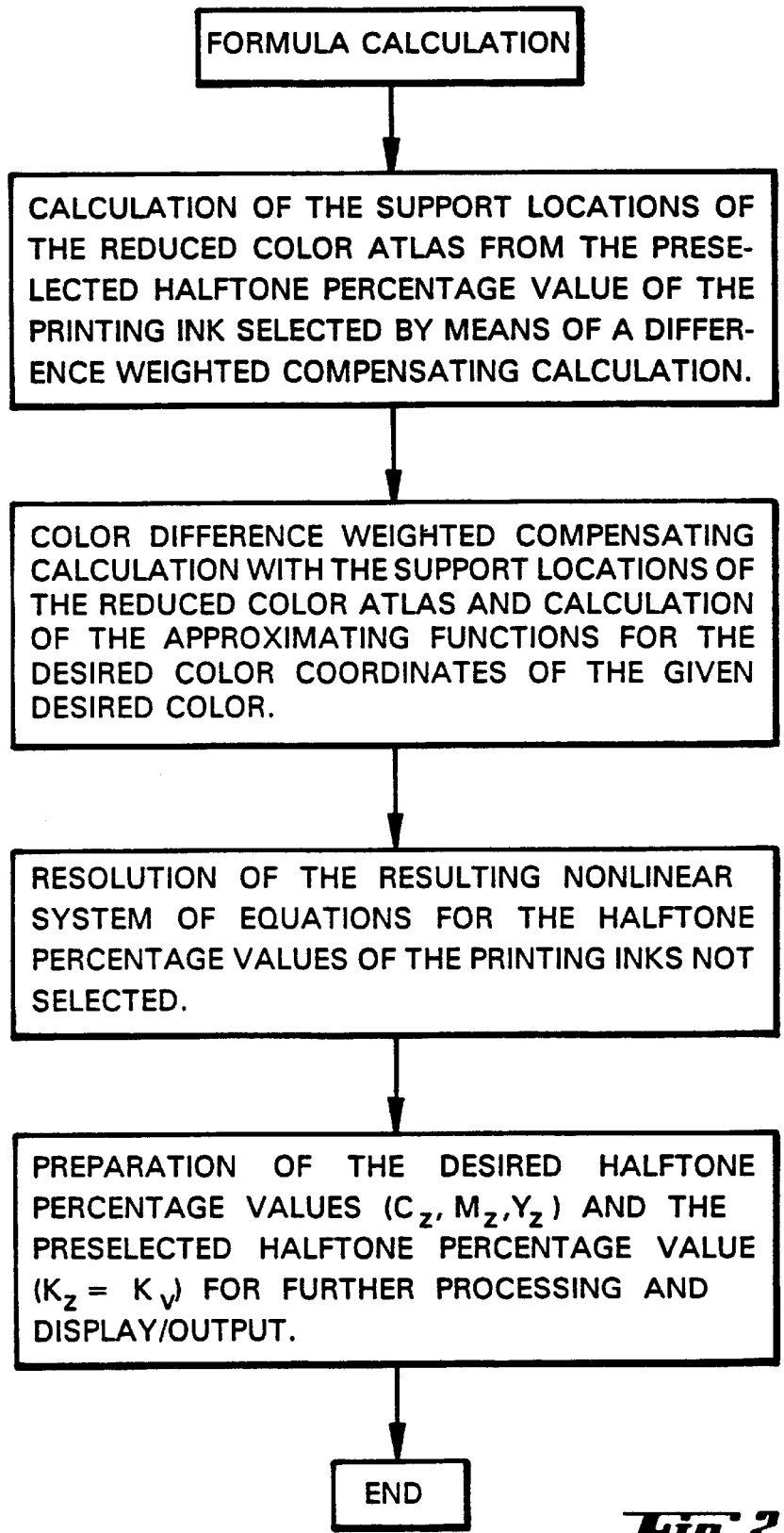
FIG. 2 shows a flow diagram of a formula calculation forming a portion of an exemplary process according to the invention.
Figure 3:
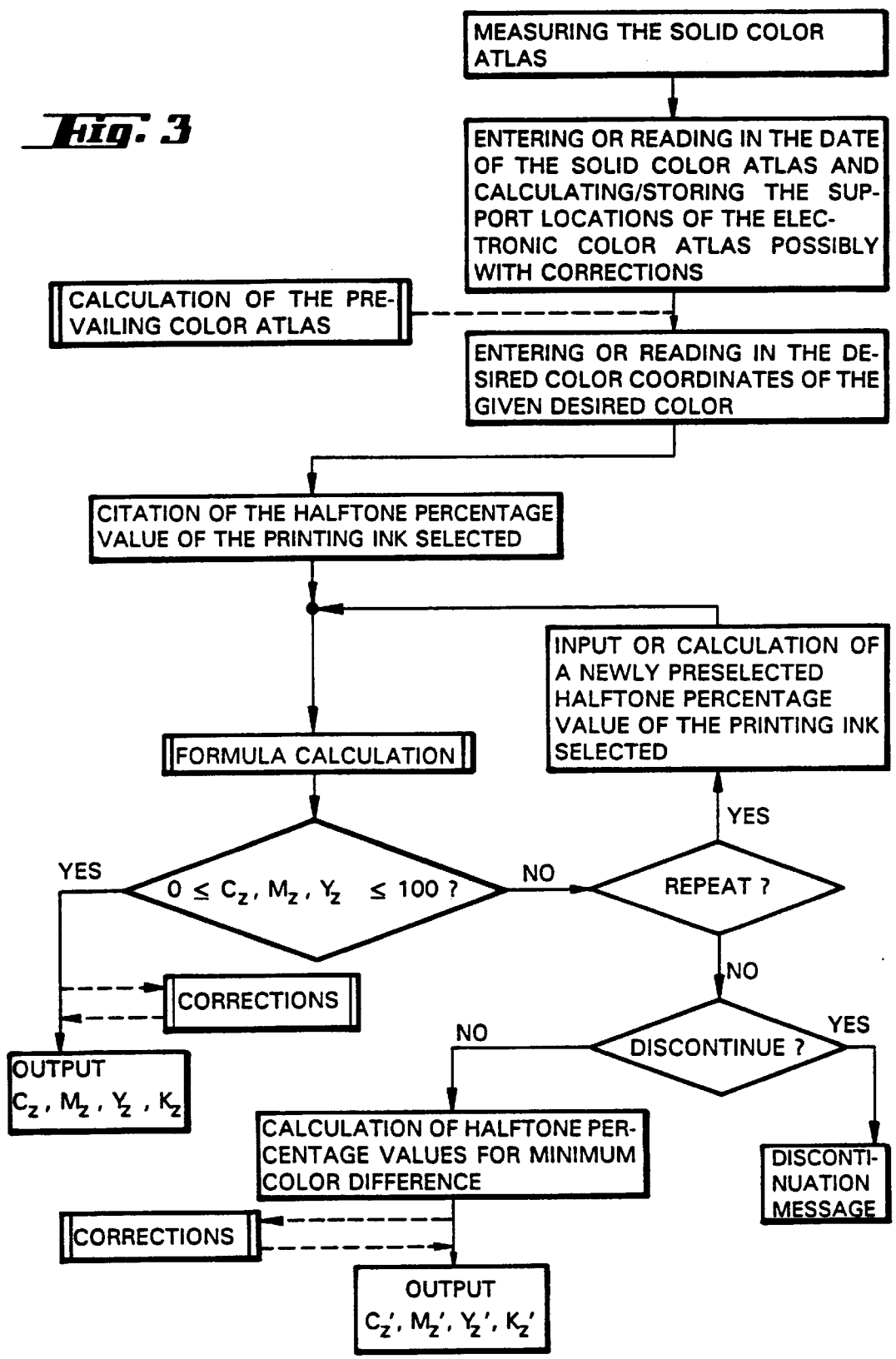
FIG. 3 shows a flow diagram of an exemplary overall process in a first variant of the present invention.

The solution of the three equations yields the halftone percentage values $C_Z$, $M_Z$, $Y_Z$ and $K_Z$ desired; the halftone percentage value of the printing ink selected (here black) obviously, corresponds to the preselected value (here $K_Z = K_V$). The process and calculation steps hereafter designated "formula calculation" in their entirety, beginning with a preselected halftone percentage value of a selected printing ink and ending with the calculation of the halftone percentage values of the other three printing inks, are now completed. FIG. 2 again shows the individual steps of the formula calculation in an overview in the form of a flow diagram. FIG. 3 is a flow diagram of the overall process, i.e., all of the process steps explained above and those to be described below.

Following the completion of the formula calculation the halftone percentage values determined are examined whether they are within the permissible value range of 0% to 100%. If this is true for all of the halftone percentage values, they are output as the result by the computer 100 in a suitable manner, for example on the screen 102 or by a connected printer or the like. Furthermore, they may also be stored for later use/processing. Another possibility consists of adding the halftone percentage values determined, together with the desired color coordinates upon which they are based, to the (electronic) color atlas as another support location.

If at least one of the halftone percentage values determined is outside the permissible range, a new value is preselected for the halftone percentage value of the printing ink chosen and the entire formula calculation repeated for this new value. If even this does not lead to results within the permissible value range of 0% to 100%, another new value is preselected and so on. If none of the preselected halftone percentage values of the printing ink chosen lead to a result feasible in view of the printing technology for the other three halftone percentage values, this indicates that the desired color to be adjusted is outside the color space printable under the given printing conditions. The process is then either discontinued with the issuance of a corresponding message or continued according to the particular configuration of the invention described in the following.

According to this configuration, the three halftone percentage values $C'_Z$, $M'_Z$, $Y'_Z$ (the fourth halftone percentage value of the printing ink chosen is preselected: $K'_Z = K_Z = K_V$) which under the given printing conditions lead to a (printable) color location, are calculated, said location to have the smallest possible color difference from the given desired color location $L_s$, $a_s$, $b_s$ that is outside the printable color space. The approximating functions $f_L$, $f_a$ and $f_b$ last determined in the formula calculation are used and the color difference $$\Delta E = \sqrt{h^2 \cdot (L_s - f_L(C, M, Y))^2 + (a_s - f_a(C, M, Y))^2 = (b_s - f_b(C, M, Y))^2}$$

is minimized under the secondary condition $0 \leq C, M, Y \leq 100$. The solution is obtained by the known methods of minimum-maximum calculation. As a result, the halftone percentage values $C'_Z$, $M'_Z$, $Y'_Z$ desired, are found. By means of the weighting factor h (0 to 1) the significance of the brightness coordinate L in the color difference may be reduced in a controlled manner (extreme case: h=0).

As mentioned above, the halftone percentage value of the printing ink selected in an alternate embodiment of the invention may be included as a variable parameter in the formula calculation instead of in the form of a preselected constant. The variation of the parameter represents an additional degree of freedom, which may be used to adapt or optimize the formula calculation relative to an arbitrary additional criterion, by repeating the formula calculation with different parameter values until the additional criterion is satisfied or approximated as well as possible.

A first example of such an additional criterion or additional secondary condition is the requirement that the halftone percentage value in a selected printing ink should have the maximum or minimum possible value to obtain the given desired color location.

For this, beginning with an arbitrary starting value for the halftone percentage value of the ink selected, the formula calculation is repeated with new values in the direction of the maximum or minimum until no enlargement or reduction of the halftone percentage value of the ink selected is any longer possible, without having one of the halftone percentage values determined of the other printing inks drop out of the permissible value range of 0% to 100%. The halftone percentage values last calculated and the last variation value of the halftone percentage value of the printing ink selected, are then displayed as the result.

Figure 4:
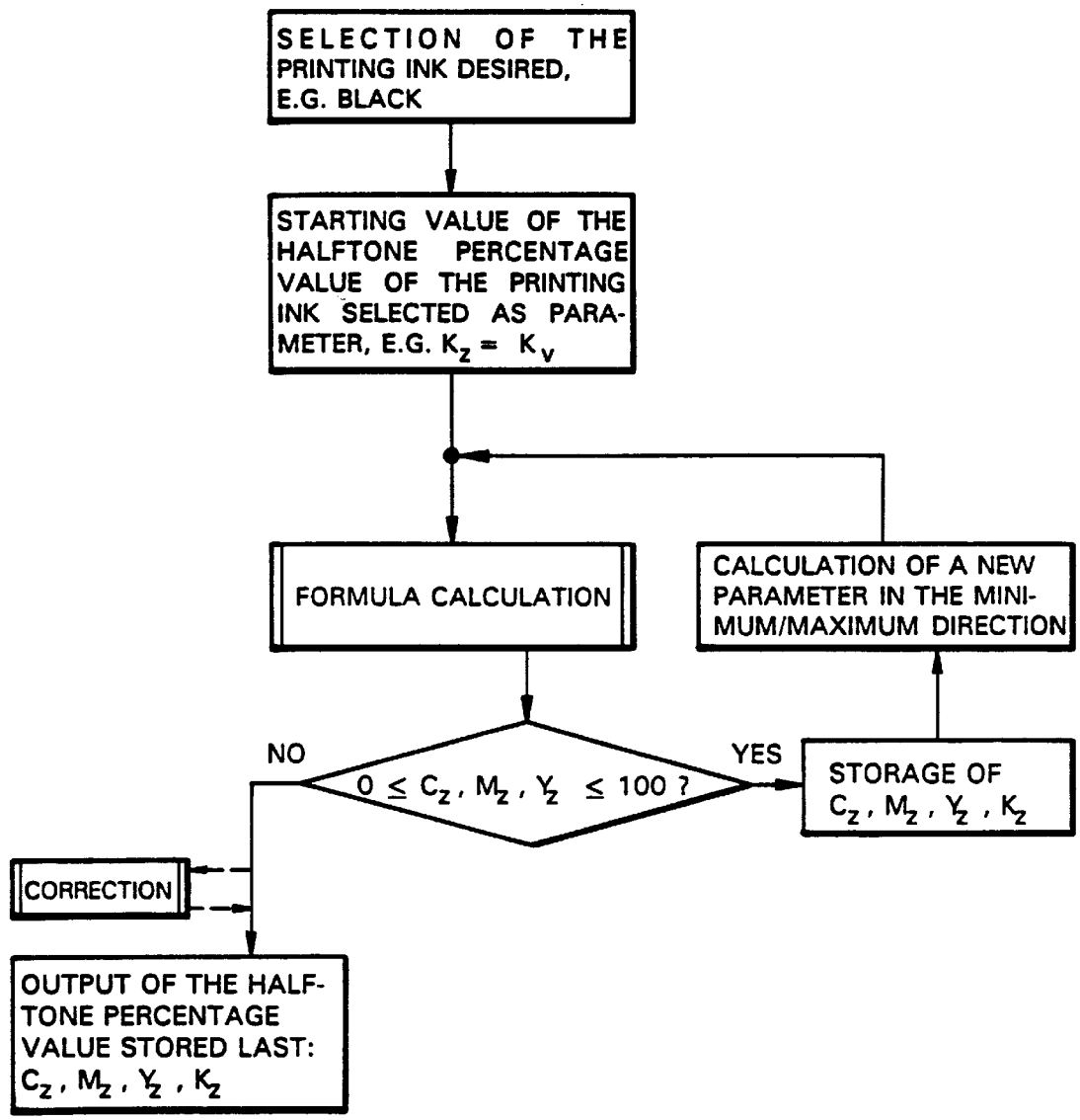
FIG. 4 shows a flow diagram of essential parts of an exemplary second process variant.

It is not absolutely necessary to carry out the variation of the parameter in an ascending or descending order. Rather each new parameter value may be calculated preferably by means of suitable, known search algorithms. The extreme value desired may usually be found more rapidly. In FIG. 4, this process variant is again shown in the form of a flow diagram.

Figure 5:
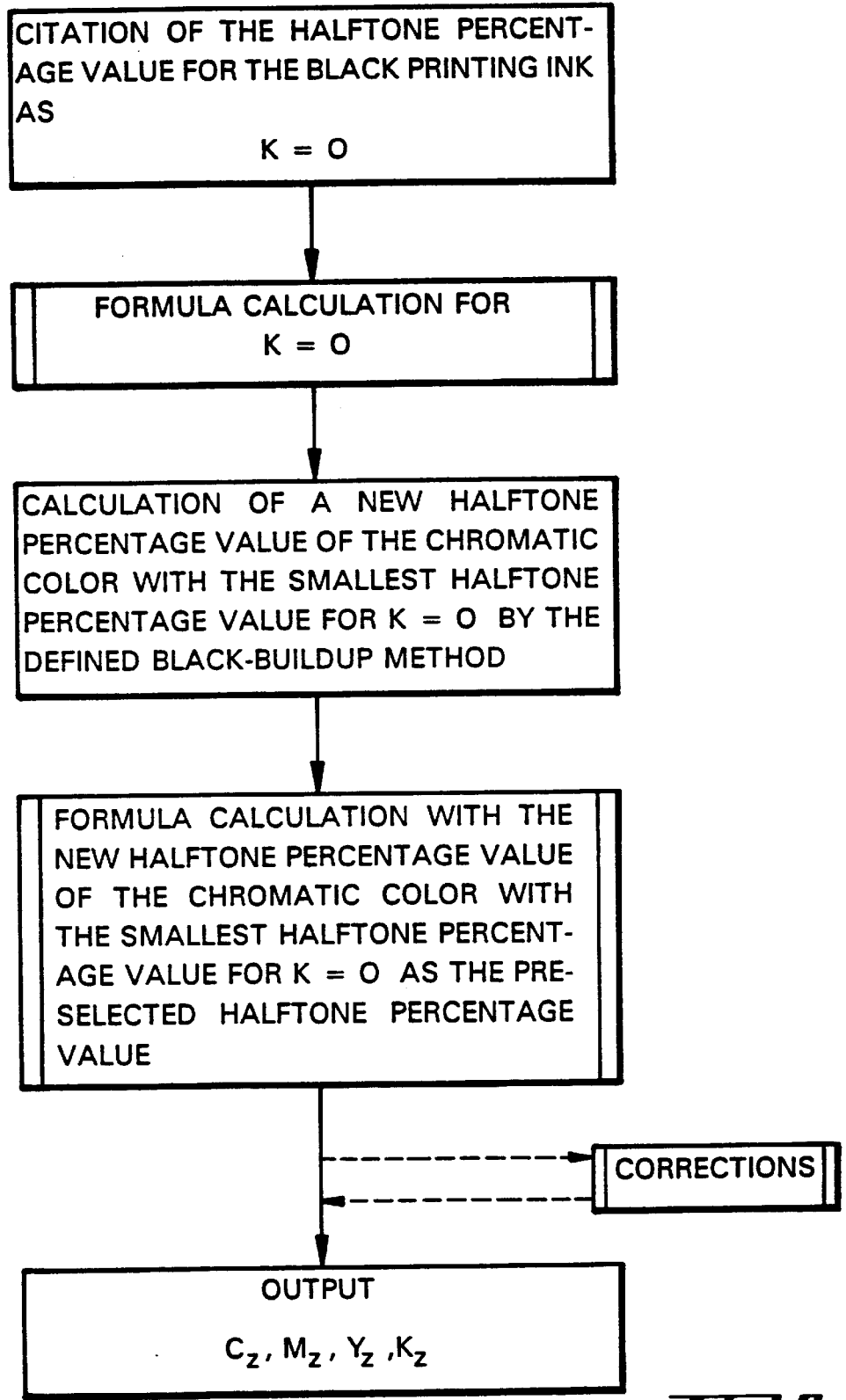
FIG. 5 shows a flow diagram of another exemplary process variant.

Another example of an additional secondary condition is the requirement that the halftone percentage value of the black printing ink should satisfy the measures of a defined black-buildup method. Such a buildup method may consist for example of replacing a certain proportion, for example 50%, of the colored printing inks by black ink, said proportion referring to the printing ink with the smallest halftone percentage value (in the absence of the black ink). If for example the halftone percentage values required without black are C=60%, M=40% and Y=20%, 0.5×20%=10% of the printing ink Y would be replaced by black. The resulting halftone percentage value of the printing ink Y is thus 10%. This value is now used as the preselected value of the selected printing ink Y and the formula of the other three printing inks C, M and K are calculated. FIG. 5 displays this again in the form of a flow diagram.

Another example of an additional secondary condition is the requirement that the metamerism of the color printed with the halftone percentage values determined of the individual printing inks should be minimal relative to the desired color. Metamerism or the metamerism index of two colored measuring objects is defined as the difference appearing under given first illumination conditions (first type of light) in the color impression of two colored measuring objects, which under given second illumination conditions (second type of light) appear to be of the same color (or at least nearly the same color). (If the two colored objects are not quite the same under the second type of light, usually a multiplying correction of the standard color values X, Y, Z under the second type of light is calculated and included in the calculation of the color difference under the first type of light).

Different (standardized) types of light enter in colorimetrics in the calculating formulas for the color coordinates from the reflectance spectra of the measuring object. Examples of standardized types of light are D 50 for daylight and A for incandescent light. The light types are characterized by their spectra and stored in tabular form in the color measuring instruments (spectrophotometers).

It has been mentioned above that in the computer 100 the reflectance spectra of the individual color fields 301 of the solid color atlas 300 are stored. In order to minimize the aforementioned metamerism effect in the determination of the halftone percentage values, according to another important aspect of the invention, from the reflectance spectra of the color fields of the solid color atlas 300, rather than prepare one electronic color atlas based on a certain type of light, a separate electronic color atlas is prepared for each type of light of interest relative to metamerism. It is assumed in the process that the characteristic light type data are stored in the computer. Alternately, the color coordinates for the different types of light may again be calculated in the spectrophotometer and transferred into the computer, if designed for it.

The stored color atlases calculated for different types of light, referred to hereafter as type of light color atlases, differ only by the stored color coordinate values, while the associated nominal halftone percentage values in the individual support locations are identical.

The metamerism effects are calculated by means of the stored type of light color atlases and the desired color locations or desired color coordinates $(L_s, a_s, b_s)_{LAi}$ as follows:

From the stored type of light color atlases, for example for the light type $LA_j$, for the desired color $(L_s, a_s, b_s)_{LAj}$ to be adjusted, the maximum and minimum halftone percentage values are determined for a selected printing ink, for example black, as described above. Within the interval defined by these two extreme values, with the halftone percentage value of the printing ink selected as the variable parameter, a formula calculation is carried out for the type of light $LA_j$. The halftone percentage values determined are designated hereafter $C_j$, $M_j$, $Y_j$ and $K_j=K_v$.

From the halftone percentage values determined in this manner, the expected actual color locations $(L,a,b)_{LAi \neq j}$ are calculated with the other types of light $LA_{i \neq j}$. (If the halftone percentage values do not coincide with a support location but are intermediate values, the associated color coordinates are determined in the individual type of light color atlases by interpolation by means of a compensating calculation similar to the one described above relative to the formula calculation).

The individual metamerism effects $MET_i$ are now determined as color differences between the actual color locations calculated and the associated desired color locations with the individual types of light $LA_i$:

$$MET_i = \Delta E_i = \sqrt{(L_{LA_i} - L_{s_{LA_i}})^2 + (a_{LA_i} - a_{s_{LA_i}})^2 + (b_{LA_i} - b_{s_{LA_i}})^2}$$

(for i=j, $MET_i$ is by definition zero).

The total metamerism effect MET is now set as the weighted sum of the individual metamerism effects $MET_i$:

$$MET = \Sigma_i m_i \cdot MET_i$$

Here, $m_i$ are the weighting factors assigned to the individual metamerism effects $MET_i$, which in the simplest case may all be equal. The summation is performed over the number of the types of light considered. In actual practice, this number will usually be restricted to the two types listed, D50 and A, so that the total metamerism effect is identical with the individual metamerism effect with these two types of light.

The formula for the total metamerism effect MET given above contains the preselected halftone percentage value $K_v$ of the printing ink selected (here black) as a parameter freely chosen within the interval cited, or as a free variable. By means of suitable numerical searching processes, for the so-called interval nesting, the parameter is determined within the given interval so that the total metamerism effect MET becomes minimal. The parameter $K_v$ determined in this manner and the associated halftone percentage values of the other three printing inks are then output as the formula.

In the foregoing, it was assumed that the printing conditions under which the solid color atlas 300 has been produced are identical with the printing conditions for the desired color to be adjusted. According to a further key aspect of the invention, the process may be expanded so that it may be applied even if there are deviations in the printing conditions. In the following, an exemplary process to be followed according to the invention if different printing machines are used having varying printing characteristics will be described. Printing characteristics are defined as the relationship between the nominal halftone percentage values in the halftone films or printing plates upon which the process is based and the tonal value increments or halftone dot increases experienced in printing. The tonal value increment is the difference between the surface coverages (halftone percentage values) on the printing plate (halftone film) and in print.

In the nominal surface coverages 0% and 100%, the tonal value increments are obviously zero. If the tonal value increments of a printing ink are known for (at least) two average nominal surface coverages, for example 40% and 80%, the associated printing characteristic for the printing ink involved may be approximated with adequate accuracy by a third degree polynomial t(A):

$$Z(A) = a_0 + a_1 \cdot A + a_2 \cdot A^2 + a_3 \cdot A^3 \equiv t(A)$$

Here, A signifies the nominal surface coverage or nominal halftone percentage value of the film, and Z(A) signifies the tonal value increment as a function of A and $a_0$ to $a_3$, the constant regression coefficients. Substitution of the four known tonal value increments yields four equations whereby the four regression coefficients $a_0$ to $a_3$ are determined. With more support locations the printing characteristic may be approximated by a polynomial of a higher order.

For typical printing conditions under which the solid color atlas 300 (hereafter referred to as the typical color atlas), has been produced, the tonal value increments for the individual printing inks at different halftone percentage values may be calculated directly from the known stored nominal halftone percentage values of the single color fields of the typical color atlas (4×3 single color fields+paper white) and the reflectance spectra of the color fields involved. Suitable processes are described in the literature and require no further explanation. Alternatively, the tonal value increments may also be determined by a known measuring instrument developed for this purpose and entered in the computer.

From the known nominal halftone percentage values of the single color fields and the measured or calculated associated tonal value increments, the printing characteristics upon which the typical printing conditions are based are determined for the four printing inks:

$$Z_{typ}(C) = t_c\ (C)$$

$$Z_{typ}(M) = t_m\ (M)$$

$$Z_{typ}(Y) = t_y\ (Y)$$

$$Z_{typ}(K) = t_k\ (K)$$

wherein C, M, Y and K signify the nominal (film) halftone percentage values in the printing inks cyan, magenta, yellow and black and $t_c$, $t_m$, $t_y$ and $t_k$ represent for the third degree polynomial with the proper regression coefficients $a_0$ to $a_3$ for each printing ink.

In a similar manner, printing characteristics for the prevailing printing conditions under which the desired color to be adjusted is to be printed are determined. For this, a print control strip with an unprinted field (paper white) and with a fulltone field (100%) and at least two single color halftone fields with known average nominal surface coverages, is printed under prevailing printing conditions for each printing ink and the corresponding tonal value increment of the individual halftone fields measured. From this, the prevailing printing characteristics are calculated:

$$Z_{aki}(C) = T_c(C)$$

$$Z_{aki}(M) = T_m(M)$$

$$Z_{aki}(Y) = T_y(Y)$$

$$Z_{aki}(K) = T_k(K)$$

wherein C, M, Y and K again signify the nominal halftone percentage values in the four printing inks and $T_c$, $T_m$, $T_y$ and $T_k$ stand for the said third degree polynomials with the proper regression coefficients $a_0$ to $a_3$ for each printing ink.

In order to take into account the differences between the typical and prevailing printing conditions due to the different printing characteristics and to render the process applicable even under different printing conditions, according to another important aspect of the invention, corrected formulas are calculated from the halftone percentage formulas determined according to the foregoing, as follows:

$$C_z' + Z_{aki}(C_z') = C_z + Z_{typ}(C_z)$$

$$M_m' + Z_{aki}(M_z') = M_z + Z_{typ}(M_z)$$

$$Y_z' + Z_{aki}(Y_z') = Y_z + Z_{typ}(Y_z)$$

$$K_z' + Z_{aki}(K_z') = K_z + Z_{typ}(K_z)$$

wherein $C_z, M_z, Y_z$ and $K_z$ signify the halftone percentage values determined in the formula calculations (typical color atlas) of the four printing inks, $C_z'$, $M_z'$, $Y_z'$ and $K_z'$ signify the corresponding corrected values, and $Z_{typ}$ and $Z_{aki}$ signify the typical and prevailing printing characteristics (tonal value increments) for the four printing colors. (The four equations are to be solved for $C_z'$, $M_z'$, $Y_z'$ and $K_z'$).

Figure 6:
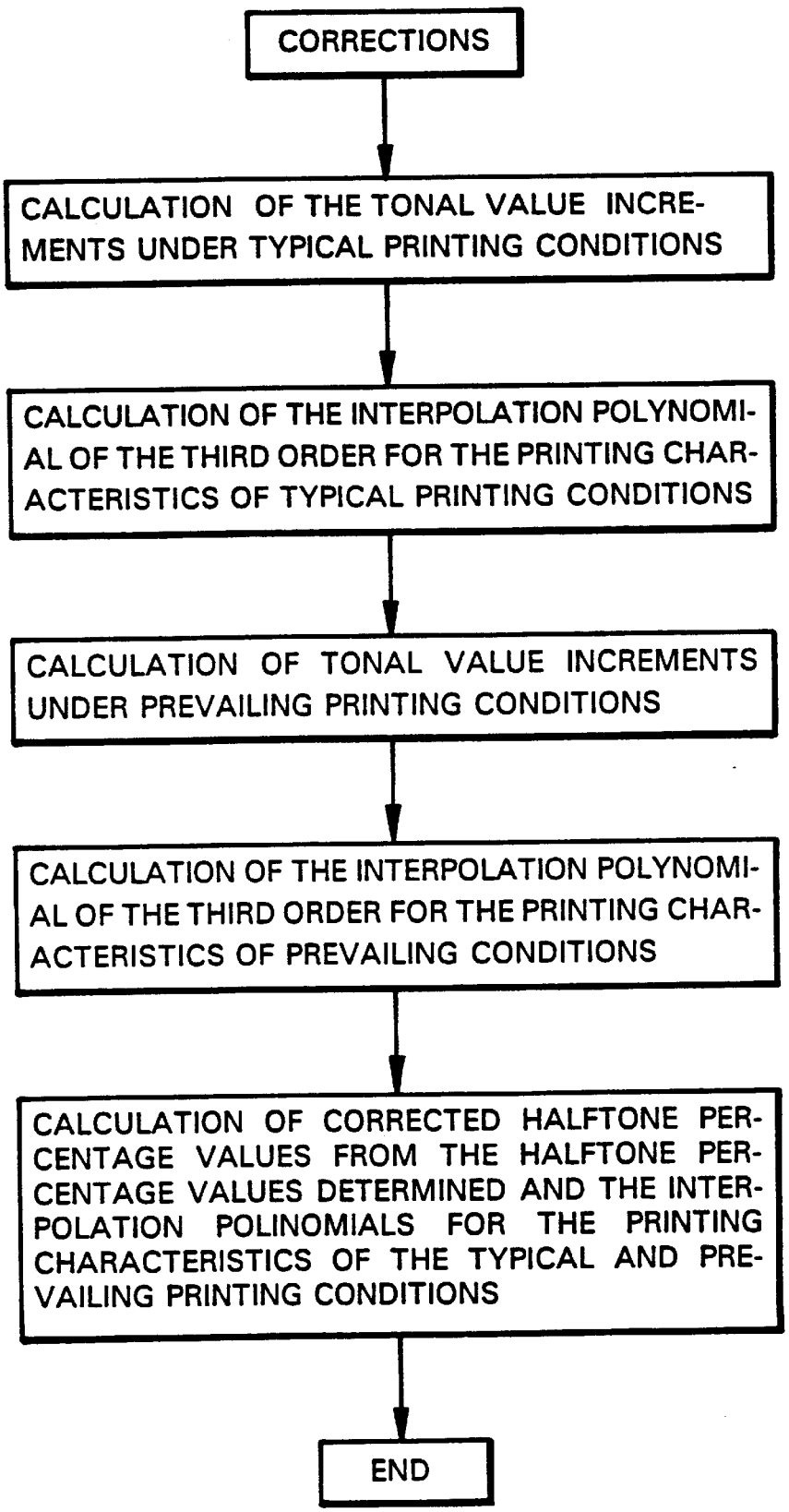
FIG. 6 shows a flow diagram of individual steps of an exemplary correction process.

The correction steps explained above are symbolized in FIGS. 3–5 by the block labelled (Corrections). The individual steps are clearly summarized in FIG. 6 in the form of a flow diagram. Obviously, the printing characteristics need to be calculated once only and may be used over and over to correct the formula, if the printing conditions remain constant.

Another cause of different typical and prevailing printing conditions may arise from when, in the actual printing process, a different paper (substrate) is used than the one used to produce the solid color atlas upon which the stored electronic color atlas is based. This paper or generally substrate dependent difference may be taken into account according to another aspect of the invention by correcting calculation of the color coordinates of the color fields or support locations of the electronic color atlas from the reflectance spectra of the color fields. For this, the reflectance spectrum of the prevailing paper (substrate) is established. The reflectance spectrum of the typical paper upon which the typical solid color atlas is printed, is already available in the form of the reflectance spectrum of the color field with the halftone percentage value zero in all four printing inks. For each discrete wave length of the spectra, the quotient of the associated spectral value of the prevailing paper and the associated spectral value of the typical paper is calculated and the reflectance spectra of the individual color fields are corrected so that each individual spectral value of a given wave length is multiplied with the quotient calculated for said wave length. This is represented by the formula:

$$R'(\lambda) = R(\lambda) \cdot [R_{aki}(\lambda)/R_{typ}(\lambda)]$$

wherein $R_{aki}(\lambda)$ and $R_{typ}(\lambda)$ are the spectral reflectance values of the actual and the typical paper at the wave length of $\lambda$, $R(\lambda)$ are the spectral reflectance values measured on the solid color atlas of the individual color fields at the wave length $\lambda$, and $R'(\lambda)$ are the corresponding corrected spectral reflectance values, from which, as described, the color coordinates for the prevailing color atlas (for one or several types of light) are calculated.

Instead of correcting the reflectance spectra, alternatively the standard color values obtained in the calculation of the color coordinates according to CIE as intermediate values may be corrected and included. For this, the standard color values for the actual paper and the typical paper are calculated and the quotients of the corresponding standard color values formed. The standard color values obtained in the calculation of the individual color fields are then multiplied by the proper quotient:

$$X_i' = X_i \cdot [X_{akti}/X_{typi}] i=1,2,3$$

wherein $X_{akt\ i}$ and $X_{typ\ i}$ are the standard color values of the actual and typical paper, $X_i$ are the standard color values of the individual color fields calculated from the reflectance spectra and X' are the corresponding corrected standard color values.

Another possibility to apply a process according to the invention to actual printing conditions, (i.e., other than the typical printing conditions under which the solid color atlas has been produced), according to another key aspect of the invention, consists of bringing up to date the stored typical color atlas by means of a few support locations obtained under actual printing conditions. For this purpose, under the actual printing conditions, a special printing control strip 500, referred to hereafter as the solid comparative color atlas, is printed with a relatively few, for example, 32 color fields 501 and its data are entered into the computer in a manner similar to the stored typical color atlas (FIG. 1). The color fields of the comparative color atlas typically contain the nominal halftone percentage values characteristic of the actual printing conditions in the individual printing inks, including one fulltone field (100% surface coverage) for the three chromatic colors, together with an unprinted field (paper white). For example, for the black printing ink, only two surface coverage graduations are provided. The comparative color atlas is thus relatively handy, easy to prepare and may be transferred to the computer 100 without any great effort.

Following the reading of the data of the solid comparative color atlas into the computer, the latter contains its electronic equivalent in tabular form. This is again referred to hereafter as the comparative color atlas. It contains, for each of the 32 color fields or support locations assumed in the example, the four nominal halftone percentage values and the three associated color coordinates in a manner similar to the more voluminous typical color atlas with its (in the aforementioned example) 256 support locations.

As the next step, from the stored typical color atlas and the newly prepared comparative color atlas, a difference color atlas is formed with the same number of support locations as the comparative color atlas. In actual fact this signifies that for every support location of the comparative color atlas the differences of the associated color coordinates with the corresponding color coordinates of the typical atlas are formed. If the support locations of the comparative color atlas do not coincide with those of the typical color atlas, in the typical color atlas the color coordinates belonging to the halftone percentage values given by the support locations of the comparative color atlas are interpolated by means of the compensating calculation explained in detail relative to the formula calculation. Again, by means of a similar compensating calculating method, the difference color atlas is extended by interpolating for all support locations of the typical color atlas and the halftone percentage values defined thereby for the individual printing inks, the associated color coordinate differences from the 16×3 color coordinate differences calculated previously in the 16 original support locations of the difference color atlas. It is usually sufficient to carry out the interpolation linearly, which reduces the computing effort.

Finally, the difference color atlas containing, among others, the same support locations as the typical color atlas is combined with the typical color atlas by the individual addition of support locations into a prevailing color atlas. In actual fact, this means that in each support location i of the typical color atlas, the corresponding three color coordinate differences $\Delta L_i$, $\Delta a_i$, $\Delta b_i$ of the difference color atlas are added to the three stored color coordinates $L_i, a_i, b_i$ in the same support locations. The prevailing color atlas formed in this manner then has the characteristic behavior of the typical color atlas, but is adapted to the prevailing printing conditions and coincides exactly at the support locations of the comparative color atlas with the latter.

By adaptation according to the invention of the typical color atlas to the prevailing printing conditions by means of a relatively simple and highly restricted comparative color atlas, the need of known systems to prepare a complete new color atlas upon any change in the printing conditions is avoided.

Figure 7:
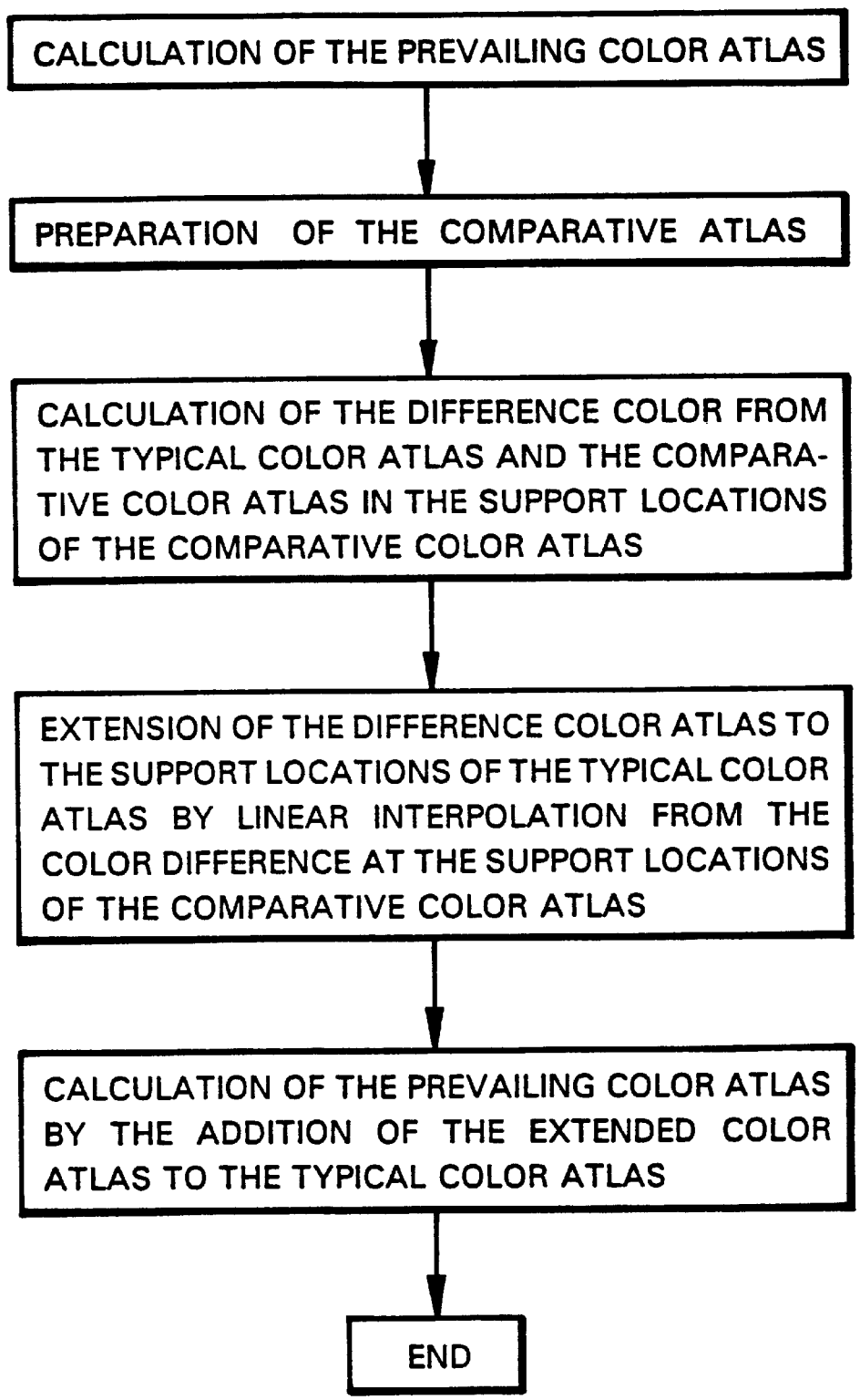
FIG. 7 shows a flow diagram of individual steps of a prevailing actualization of the color atlas.

The individual steps of the preparation of the prevailing color atlas are compiled in FIG. 7 in the form of a flow diagram. The graphic views of FIGS. 8*a*–8*c* provide further explanations.

FIGS. 8*a*–8*e* show segments of a typical color atlas (FIG. 8*a*), a comparative color atlas (FIG. 8*b*), a difference color atlas (FIG. 8*c*) formed from it, a difference color atlas (FIG. 8*d*) extended by interpolation and a prevailing color atlas (FIG. 8*e*). The views are reduced to two dimensions for the sake of clarity. In reality, however, it is a five-dimensional space with the independent coordinates C, M, Y and K and the three dependent coordinates, L, a and b, and $\Delta L$, $\Delta a$, $\Delta b$, respectively.

The support locations of the typical color atlas are designated by i, the associated color coordinates by $L_i$, $a_i$, $b_i$. The support locations of the comparative color atlas are designated by j, the associated color coordinates by $L_j$, $a_j$, $b_j$. The difference color atlas contains only the support locations j with the associated color coordinate differences $\Delta L_j$, $\Delta a_j$, $\Delta b_j$. The interpolated intermediate values of the color coordinates of the typical color atlas in the support locations j are designated $L_i(j)$, $a_i(j)$ and $b_i(j)$.

All of the process steps described above for the determination of the halftone percentage values of the individual printing inks are now carried out on the basis of the prevailing color atlas in place of the typical color atlas. It is understood that the aforedescribed correction measures may be applied in the case of varying printing conditions in connection with the prevailing color atlas also.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Apparatus for determining halftone percentage values required to obtain a given desired color location using individual printing inks in autotype multicolor printing, comprising:

a photometric measuring instrument capable of determining at least one of a reflectance spectrum and color coordinates of a measured object; and a computer connected with said photometric measuring instrument and equipped with an operating keyboard, a data output device, a program memory and a working memory, said computer being programmed to determine color locations of color fields defined by color coordinates; to store the color locations of the color fields together with known graduated halftone percentage values of the color fields; and to determine halftone percentage values of the given desired color location based on desired color coordinates of the given desired color location by interpolating the halftone percentage values of the given desired location from the stored color coordinates and the stored halftone percentage values of the color fields using a differential weighted compensating calculation wherein a relationship between the stored halftone percentage values and the stored color coordinates of the color fields in a vicinity of the desired color location is approximated by approximating functions, such that greater differences between stored color coordinates and the desired color location are weighted less in the differential weighted compensating calculation than smaller differences.

2. Apparatus according to claim 1, wherein the computer is contained in the photometric measuring instrument.

* * * * *